United States Patent [19]

Means et al.

[11] 3,832,689

[45] Aug. 27, 1974

[54] DATA-TRANSMISSION APPARATUS

[75] Inventors: David K. Means, Ann Arbor; Thomas M. Luther, Saline, both of Mich.

[73] Assignee: Reliance Electric Company, Ann Arbor, Mich.

[22] Filed: Sept. 6, 1973

[21] Appl. No.: 394,739

[52] U.S. Cl. ........................ 340/147 LP, 340/147 R

[51] Int. Cl. ............................................. H04q 5/00

[58] Field of Search ................... 340/147 LP, 147 R

[56] References Cited

UNITED STATES PATENTS 3,772,651 11/1973 Thyssens ....................... 340/147 LP

*Primary Examiner*—Harold I. Pitts

*Attorney, Agent, or Firm*—Richard G. Stephens

[57] ABSTRACT

In a system wherein plural data-handling modules are connectable to time-share a data bus, determination of which module may control the bus at any given instant is made by a plurality of simple conflict-resolving circuits which are associated with respective modules so as to allow economical expansion of the data-handling system. If two modules request control while a third module is using the bus, a decision is immediately made as to which of the two modules will be the next to be given control of the bus.

12 Claims, 3 Drawing Figures

DATA-TRANSMISSION APPARATUS

SUMMARY OF THE INVENTION

Our invention relates to data-transmission systems in which a plurality of different modules, such as computers, computer peripheral units, or like devices, are each connected to a common data bus to transmit information to and/or receive information from other modules within the system. Whenever the system can allow more than one module to control the transfer of information within the system, some form of bus arbitration or priority allocation is required in order to insure that not more than one module will control the bus at a given instant in time. The problem of bus arbitration is complicated by the fact that requirements for bus control in general arise independently within individual modules in an asynchronous and unpredictable fashion. Various arbitrary control systems are usable for certain applications, but practically unworkable for some important applications. For example, systems may be devised in accordance with straight-forward techniques to rank the different modules in an arbitrary order, and to grant bus control at any time to the highest-numbered module then requesting control, even before a lower-numbered module then using the bus has not finished transmitting. Such arrangements sometimes result in one or more modules seldom or never gaining bus control, and are unworkable in various applications. An important requirement in many applications is that whatever priority scheme be implemented, that once a given module is granted control its use of the bus not be arbitrarily interrupted before it has finished using the bus. Most prior art systems which involve control of a bus by plural modules have employed some dedicated piece of hardware attached to the bus which arbitrates plural requests for bus control from the modules and grants bus control to one of the competing modules in accordance with some priority algorithm. While such an arrangement is quite acceptable for many applications, it tends to become uneconomical in a system which may be expanded from a small number of modules, say two, to a potentially large number of modules, say 32. The dedicated arbitrator must be able to handle as many requests as may possibly exist in a fully expanded system. Provision of hardware capable of handling a large number of requests is obviously wasteful if the system is never fully expanded. Also, if the system must be expanded to incorporate more modules than the maximum number originally contemplated, the dedicated arbitrator may have to be scrapped and a larger arbitrator provided. Thus it becomes highly desirable in such data-handling systems to provide an arbitration system that is distributed over, and expandable with the number of modules which can potentially control the bus, rather than to provide a lumped arbitrator resident on the bus at all times. Hence it is a primary object of the present invention to provide improved bus request arbitration method and apparatus for use in data-handling systems wherein plural modules may control a data bus, and a more specific object of the invention to provide such apparatus in a form which lends itself to economical modular expansion. Another object of the present invention is to provide improved bus requests arbitration method and apparatus wherein the use of the bus by a module which has been granted control need not be interrupted before that module has finished its use of the bus and transmitted a "done" signal, even if requests for use of the bus emanate during the meantime from other modules.

Various bus allocation schemes are disadvantageous because each decision respecting which module shall be the next to use the bus is made at the time when a module then using the bus finishes and relinquishes control. In any system where plural modules can request control at random or unpredictable instants, the modules must be ranked in some predetermined order to determine which module gains control when two modules begin to request control at the same instant. If requests emanate from plural modules while another module is using the bus, delaying the decision process until the bus is relinquished not only delays allocation of the bus to a different module, but it also results in servicing of plural bus requests in an order other than that in which they occur, sometimes resulting in a lower-ranked module seldom gaining control, even if it has consistently requested control before one or more higher-ranked modules. Another object of the invention is to provide improved bus allocation method and apparatus wherein a module which requests control before any other module, during a period when a third module is using the bus, will not be deprived of control if other modules make requests before the third module relinquishes control of the bus. A further object of the invention is to provide such an arrangement without the need for elaborate storage circuits which store plural bus requests in the order in which they are made.

Other objects of the invention will in part be obvious and will in part appear hereinafter.

The invention accordingly comprises the features of construction, combination of elements, and arrangement of parts, which will be exemplified in the constructions hereinafter set forth, and the scope of the invention will be indicated in the claims.

BRIEF DESCRIPTION OF THE DRAWINGS

For a fuller understanding of the nature and objects of the invention reference should be had to the following detailed description taken in connection with the accompanying drawings, in which.

DESCRIPTION OF THE PREFERRED EMBODIMENT

Figure 1:
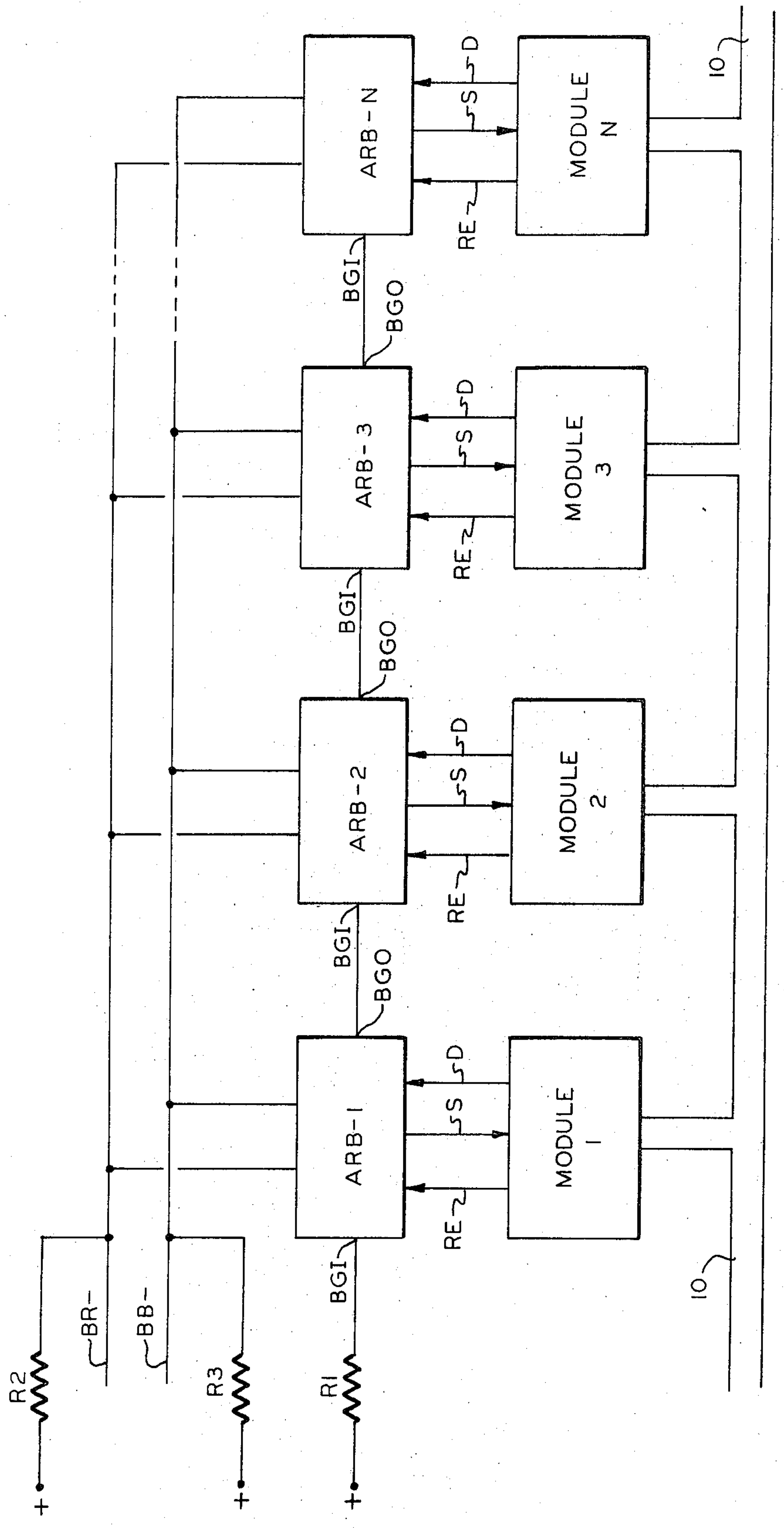
FIG. 1 is a block diagram of an exemplary form of the invention.
Figure 2:
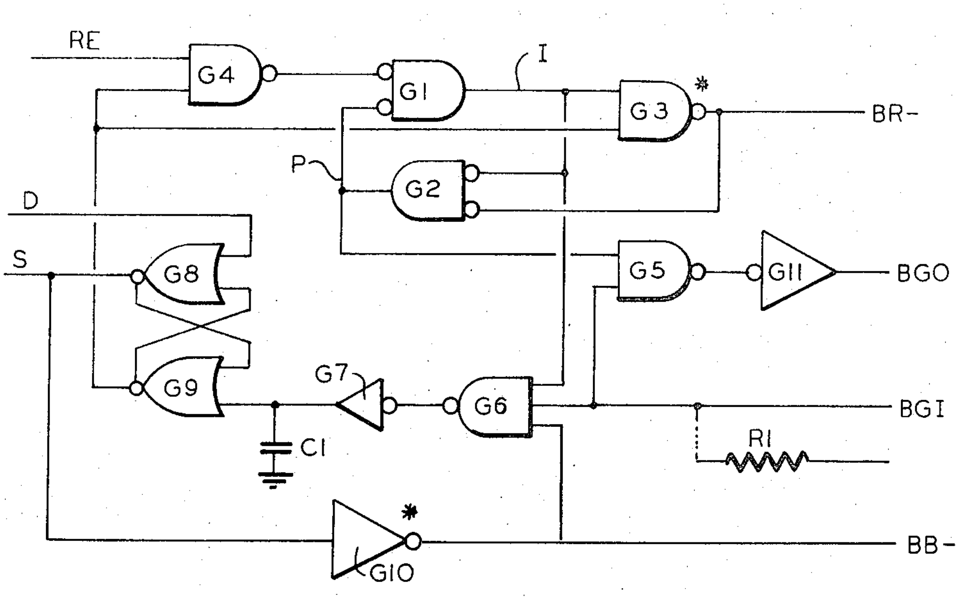
FIG. 2 is a schematic diagram illustrating one form of arbitrator unit which may be used to practice the invention.

In FIG. 1 each of a plurality of n modules are connected to a bus 10 which may carry data and address information. Associated with each module is a respective arbitrator block of the group ARB-1 to ARB-N, and as modules are added to the system, an arbitrator block is added with each module. Details of an exemplary form which each arbitrator block may take are shown in FIG. 2. Each module is connected to its associated arbitrator unit by a respective trio of lines labelled RE, S and D. Each module requests control of bus 10 by raising its respective "request" line RE. A given module is granted control of bus 10 when its respective arbitrator block raises its "service" line S, and when a module no longer requires control of bus 10 it so signifies to its respective arbitrator block by raising its "done" line D. In many applications lines RE and D of a given module may be complementary outputs from a flip-flop in the given module, though such an arrangement is not necessary. A pair of control lines BR- ("bus request not") and BB- ("bus busy not") extend to all of the arbitrator blocks. Each arbitrator block has a BGI ("bus grant in") input terminal and a BGO ("bus grant out") output terminal. The arbitrator blocks are cascaded in the sense that the BGO output terminal of each block (other than the last block, ARB-N) is connected to the BGI input terminal of a next higher-numbered block.

Assuming no module is using the bus, then the first module to request control of bus 10 is immediately granted control. Assuming instead that one module is using the bus, the first of the remaining modules to request control will be granted control, not immediately, but as soon as the one module relinquishes control. If two or more modules request control simultaneously, then control is granted immediately if another module is not then using the bus, or as soon as a module then using the bus relinquishes control, to whichever of those modules requesting control is nearest the head of the chain in FIG. 1, i.e., whichever has the lowest module number in FIG. 1. Each time control of the bus is granted to one module, a decision may be made respecting which of the remaining modules will be the next to be granted control. If two (or more) of the remaining modules are requesting control at the time control is granted to the one module, a decision is made at that time that the lowest-numbered of the two remaining modules then requesting control will be granted control next. Thus lower numbered modules enjoy a measure of priority over higher numbered modules if both are requesting control at the time control is granted to some other module. However, a lower numbered module will not be given priority over a higher numbered module if, after some other module has been granted control, the lower numbered module transmits its request later than the time at which the higher numbered module transmits its request. This procedure tends to insure that any module that requests the bus will be given control within some reasonable time and is an important feature of the invention.

Each arbitrator block is capable of being switched into one of three distinct states, namely a neutral or idling state, a requesting state, or a propagating state. Once the first request has occurred, each arbitration block in the system assumes either the requesting state or the propagating state. Each arbitration block remains in the requesting state so long as its associated module is requesting control of the bus, and remains in the propagating state only so long as any arbitrator module is requesting control of the bus. Assume, for example, that module N was first to request control of the bus, was granted control of the bus, and is placing information on, or taking information from, the bus. Now, until one of the other modules requests control, all of the other modules will be in the neutral or idling state. Then, when a further module, say module 3, requests control of the bus, arbitrator block ARB-3 will assume the requesting state and all other arbitrator blocks will assume the propagating state. Being in the progagating state, arbitrator block ARB-1 will apply a bus-granting signal on its BGO output line to the bus-granting input line BGI of arbitrator block ARB-2, and arbitrator block ARB-2 will apply a bus-granting signal on its BGO output line to the BGI input line of block ARB-3, etc. Thus each arbitrator block which is in the propagating state, i.e., whose associated module is not requesting bus control, will pass a bus-granting signal to its adjacent higher numbered arbitrator block if it receives a bus-granting signal from its adjacent lower-numbered arbitrator block. Thus if module 3 made the request for bus control, a bus-granting signal would be passed from ARB-1 to ARB-2, and from ARB-2 to ARB-3, but not from ARB-3 to any of the higher-numbered arbitrator blocks. Thus module 3 will have been established as the next module to be given control of the bus while module N is using the bus. Then, when module N, which was assumed to have had control of the bus, releases control by raising its line D, its arbitrator block ARB-N indicates the release by raising line BB-, and then arbitrator block ARB-3, after a brief interval for settling, secures control of the bus, lowering line BB- and releasing line BR-.

As shown in FIG. 2, each arbitrator block will be seen to require only six nand gates (G-1 to G-6), three inverters (G-7, G-10, G-11) and a pair of nor gates (G8 and G9) which are cross-coupled to form an RS flip-flop. Asterisks adjacent the G3 nand gate and the G10 inverter in FIG. 2 are intended to indicate that these two gates in each arbitrator block have open collector output lines to provide wired OR operation. The open collector output lines of all G3 gates are connected to line BR- to which pull-up resistor R2 (FIG. 1) is connected, and similarly, the output lines of all G10 inverters are connected to line BB- and pull-up resistor R3. Thus a low logic signal from any one of the G3 gates will lower line BR-, and a low logic signal from any one of the G20 inverters will lower line BB-. Such an arrangement connects all of the arbitrator block G3 gates in parallel to line BR-, and connects the G10 inverters of all arbitrator blocks in parallel to line BB-, and avoids the delays required in some prior systems wherein signals must be propagated along the chain from one module to the next through one or more gates in each module.

Referring now to FIGS. 1 and 2, first assume that no module is requesting bus control, so that line BR- is high, and further assume that no module presently has bus control. With line BR- high, the gate G2 output in each arbitrator unit will be low, and with no control module requesting control, the line RE in each arbitrator unit will be low, making the gate G4 output high in each arbitrator unit. Thus each arbitrator unit will be in an idling state, with its G1 and G2 gate outputs both low, its flip-flop cleared (G9 output high, G8 output low), its inverter G10 applying a high signal to the BB- control line, and its inverter G11 providing a low signal on its BGO output line.

Now assume that module 3 associated with arbitrator unit ARB-3 issues a request for bus control by raising the RE input line to unit ARB-3. The G4 output in ARB-3 will go low, making the G1 output in ARB-3 go high, so that ARB-3 now is in the requesting state, with its G1 gate output high and its G2 gate output low. The high G1 output lowers the G3 output of ARB-3, thereby lowering the BR- control line, which extends to all the arbitrator units. The first arbitrator unit in the chain, ARB-1, senses the lowering of the BR- control line, which causes the output of gate G2 in ARB-1 to go high, thereby putting ARB-1 into the propagating condition, with its G1 gate output low and its G2 gate output high. With the G2 gate output high in ARB-1, its gate G5 is enabled to raise the ARB-1 BGO output line. Since the ARB-1 unit is the first unit in the chain and does not receive a BGI input signal from a preceding arbitrator unit, a logic 1 may be permanently wired to its BGI input terminal, as is shown at resistor R1. Since the ARB-2 unit is identical to the ARB-1 unit, it responds similarly to the lowering of the BR- line, enabling its gates G2 and G5 to pass the high bus grant signal it received on its BGI line out from its BGO terminal to the BGI input line of the ARB-3 unit. Since the ARB-3 unit is in the requesting state in the example assumed, its low gate G2 output disables its gate G5, so that a low signal is connected from the ARB-3 BGO output terminal to the ARB-4 BGI input terminal, and low BGI inputs are received by the ARB-4 unit and all higher-numbered ARB units in the string.

In the example assumed, no request for bus control has been made prior to the request made by module 3, and hence all arbitrator units were applying high signals to line BB-. Under such circumstances the switching of the ARB-3 unit to the requesting state serves to immediately enable gate G6 in ARB-3, thereby setting the G8–G9 flip-flop after a short delay provided by capacitor C1 associated with gate G9 of ARB-3. Setting of the ARB-3 flip-flop provides a high signal on line S to grant bus control to module 3, it provides a low signal on control line BB- to indicate to each of the remaining arbitrator units that the bus 10 is in use, and it raises the G3 output of ARB-3 to line BR-, thereby to indicate that module 3 is no longer requesting the bus control which it just has been granted.

If some other module such as module N was using the bus at the time the ARB-3 unit switched to its requesting state in the previous example, control line BB- would be low, so that gate G6 of ARB-3 would not be enabled and the flip-flop of ARB-3 would not be set until such time as module N transmitted a "done" signal on its line D to its associated arbitrator unit ARB-N to clear the flip-flop in that unit and raise control line BB-. The delay established by the capacitor C1 in each arbitrator unit serves to delay the grant of control to each module for a short time following use of the bus by a different module, to allow the bus lines to settle to a zero data condition. In a typical application a delay of 0.5 microsecond has been used.

It is important to note that if requests for bus control are made successively by several different modules while a third yet different module is using the bus, a decision as to which of the several modules shall be given control after the third module relinquishes control is not delayed until the third module does relinquish control. Rather, the first module which requests control will be granted control after the third module relinquishes control, and later requests for control made by other modules before the third module relinquishes control will be ignored until previously made requests have been granted.

Suppose module N is using the bus and that no other requests for control have been made by other modules. Assume then that a request for control is first made by module 2 and then a request made by module 1, both such requests being made while module N continues to use the bus. While module N is using the bus, but before requests for control have been made by either module 2 or module 1, the low output on line BB- from gate G11 of module N will indicate that the bus is in use. However ARB-N will have previously raised control line BR- at the time module N was granted control. With control line BR- high and no requests being made by any module, all arbitrator units, including ARB-N associated with module N then using the bus, will be in the idling state. The low output from gate G10 of ARB-N will pull down line BB- to indicate the bus is in use. If module 2 then raises its line RE, making the outputs of G4 and G1 in ARB-2 go low and high, respectively to place ARB-2 in the requesting state, the G3 output from ARB-2 lowers the BR- control line, from the G3 gates of all of the other ARB units. The lowering of the BR- control causes the output of G2 in ARB-1 to go high, thereby putting ARB-1 in the propagating condition so that it applies a logic 1 signal to the BGI input terminal of ARB-2. Since ARB-2 is in the requesting condition with its low G2 output disabling its gate G5, low signals are received at the BGI input terminals of ARB-3 and all higher numbered arbitrator units, including ARB-N. Thus the BGI input and G1 inputs conditionally enable G6 in ARB-2, and ARB-2 and module 2 then wait for module N to relinquish the bus and raise line BB-. However, before module N does so, suppose module 1 raises its line RE to request control, thereby providing a low output from gate G4 of ARB-1. The G2 output of ARB-1 is then high, however, so that the low G4 output fails to provide a high output from G1 of ARB-1. Thus it may be seen that once a given ARB unit is switched to the propagating state because another ARB unit has requested control, a later request for control by the module associated with the given unit will not switch the ARB unit of the given unit to the requesting state until the BR- line returns to the high state, forcing a temporary idling condition in all arbitrator units.

Thus it may be seen that each arbitrator block performs several functions. Firstly, it lowers control line BR- when its associated module requests control if line BR- is then high, but does not change BR- if BR- is then low. Otherwise stated, a request for control from its associated module causes an arbitrator block to go into the requesting state if line BR- is then high, but has no immediate effect if BR- is then low. When an arbitrator block goes into the requesting state, it provides a low BGO OUTPUT. Secondly, each arbitrator block goes into the propagating state if another arbitrator block lowers line BR-, and when it goes into the propagating state, it provides a high output on its BGO line if it receives a high input on its BGI line. Thirdly, each arbitrator block provides a service-granting signal S to its associated module, after a short delay, when the arbitrator block is in the requesting state, and line BB- becomes high, if it is receiving a high BGI input signal, and as it provides the service-granting signal, it releases the BR- line to allow it to rise, and it lowers the BB- line. Fourthly, each arbitrator block releases line BB- to allow it to rise when the arbitrator block receives a D or "done" signal from its associated module.

Gates G1 and G2 in each arbitrator unit form a jammed cross-coupled gate circuit which positively decides which signal occurs first of two signals which it receives. An RE signal will make the G1 output rise to provide the requesting state only if line BR- is up when the RE signal occurs.

Those skilled in the art will readily recognize that various changes may be made in the logic circuits of FIG. 2 to provide equivalent operation. For example, numerous standard changes may be made to allow use of inverted logic signals. As another example, instead of gate G9 applying an input to gate G4, gate G8 could apply a third input to gate G1.

Figure 3:
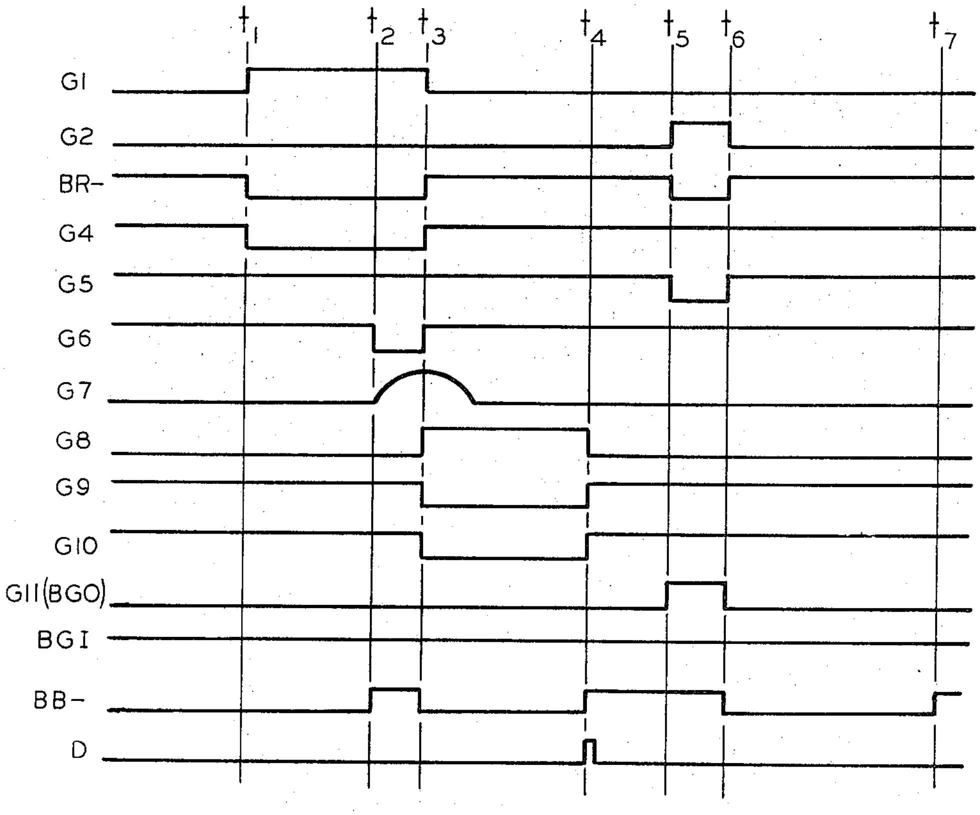
FIG. 3 is a timing diagram comprising a group of waveforms useful in understanding the invention.

FIG. 3 graphically depicts the control line logic signals and logic signals associated with arbitrator block or unit ARB-1 associated with computer module 1 through a first sequence of events as module 1 requests and is granted bus control between times $t_1$ and $t_4$, and a second series of events as module No. 2 requests and is granted control, during times $t_5$ to $t_7$. Prior to time $t_1$, and until time $t_2$, it is assumed that module N is using the bus. Therefore gate G10 of ARB-N will hold line BB- low until time $t_2$. Prior to time $t_1$, unit ARB-1 is in its idling or neutral state, so that low logic signals are present at the outputs of gates G1, G2, G7, G8 and G11 of unit ARB-1, and high outputs are present at the outputs of gates G3 to G6, G9 and G10 of unit ARB-1.

At time $t_1$ the request $RE_1$ from module 1 drives the G4 output down, which drives the G1 output up, which causes G3 to pull line BR- down. Immediately after time $t_1$ unit ARB-1 is in the requesting state and all other arbitrator units are in the propagating state. Nothing happens then until module N releases the BB- line at time $t_2$. The rise of line BB- at time $t_2$ enables G6 of ARB-1, the G6 output immediately drops, and the G7 output rises with a delay as capacitor C1 charges. At time $t_3$ the G7 output is high enough to set the G8–G9 flip-flop, which switches rapidly. The switching of the flip-flop at time $t_3$ provides an S or "service" signal to module No. 1, which then may begin putting data on the bus lines. Between times $t_2$ and $t_3$, the bus lines have time to settle. As the G8–G9 flip-flop is set at time $t_3$, the high G8 output disables G6 via G10, and the G7 output decays as the capacitor discharges, but the high output from G8 keeps the flip-flop set. The low G9 output forces the G4 output high and the G3 output high, thereby driving G1 and G2 low to return the ARB-1 unit to the idling state. Everything remains the same then until module 1 provides a "done" signal at time $t_4$ to reset the ARB-1 flip-flop.

Between times $t_4$ and $t_5$ nothing is shown occurring, and all conditions are like those prior to time $t_1$ except no module is using the bus. At time $t_5$ module 2 sends a request $RE_2$ to its arbitrator unit ARB-2. The lowering of BR- by gate G3 of ARB-2 immediately raises the G2 output of ARB-1. Thus unit ARB-2 goes into the requesting state, while ARB-1 and ARB-3 to ARB-N go into the propagating state. The high G2 output in ARB-1 enables G5 so that ARB-1 sends a high BGO bus grant signal to the BGI line of ARB-2. Since no module was using the bus at time $t_5$ and line BB-1 was high, gate G6 in ARB-2 is enabled as soon as its BGI input is received from ARB-1, and by time $t_6$ the flip-flop in ARB-2 is set. As it is set, ARB-2 releases line BR- and lowers line BB-. The rise of BR- disables G5 via G2 terminating the BGO from ARB-1. For a short time after time $t_6$ the capacitor in ARB-2 discharges. At time $t_7$ module 2 sends a done signal.

While FIG. 1 illustrates a simple system wherein the arbitrator units are cascaded (via their BGO and BGI lines) in a single series string, it will be apparent that some systems may use a parallel-series arrangement, such as a plurality of such series strings with each series string determining the control of a respective bus.

Of special importance, of course, is the fact that as further modules are connected to bus 10, no changes need be made in any of the previously connected modules or arbitrator blocks, and the fact that further modules and their associated arbitrator blocks may be added practically without limit, with very wide variations in the number of arbitrator units rarely requiring any change other than in the series of the pull-up resistors R2 and R3.

It will thus be seen that the objects set forth above, among those made apparent from the preceding description, are efficiently attained. Since certain changes may be made in carrying out the above method and in the constructions set forth without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. In a data transmission system having a plurality of data-handling modules connectable to a bus system and wherein each of said modules is operable to provide a request signal requesting control of said bus system, the combination of a plurality of arbitrator units for responding to said request signals and determining which of said modules shall control said bus system at a given time, each of said arbitrator units being associated with a respective one of said data-handling modules; first and second control lines connected to each of said arbitrator units, said arbitrator units being cascaded in a series string with a bus grant signal line extending between each adjacent pair of units in said string, and each of said arbitrator units comprising: gating circuit means responsive to one binary condition of said first control line and simultaneous receipt of a request signal from its associated module for driving said first control line to an opposite binary condition and for applying a disabling bus grant signal to the succeeding arbitrator unit in said string, said gating circuit means being responsive to an opposite binary condition of said first control line for applying to said succeeding arbitrator unit the bus grant signal which it receives; and switching circuit means responsive to said gating circuit means when said gating circuit means has responded to said request signal from its associated module, responsive to the bus grant signal received by said arbitrator unit, and responsive to a first binary condition of said second control line, for applying a service-granting signal to said associated module.

2. A system according to claim 1 wherein said switching circuit means is also operative to disable said gating circuit means so that said gating circuit means no longer drives said first control line to said opposite binary condition.

3. A system according to claim 1 wherein said switching circuit means is also operative to drive said second control line to an opposite binary condition.

4. A system according to claim 1 wherein said switching circuit means is responsive to a further signal from said associated module to terminate said service-granting signal.

5. A system according to claim 1 wherein said switching circuit means is responsive to a further signal from said associated module to return said second control line to said first binary condition.

6. A system according to claim 1 wherein said gating circuit means comprises a jammed cross-coupled gate circuit connected to receive said request signal and connected to receive an input signal from said first control line.

7. A system according to claim 1 wherein the gating circuit means of each of said arbitrator units is connected to said first control line in an OR circuit configuration, whereby any one of said gating circuit means may drive said first control line to said opposite binary condition.

8. A system according to claim 1 wherein said switching circuit means is operative to respond to a signal from said gating circuit means, said bus grant signal received by said arbitrator unit, and said first binary condition of said second control line, with a predetermined amount of delay.

9. A system according to claim 3 wherein said switching circuit means of each of said arbitrator units is connected to said second control line in an OR circuit configuration, whereby any one of said switching circuit means may drive said second control line to said opposite binary condition.

10. The method of allocating control of a bus among a plurality of data-handling modules comprising the steps of: connecting each of said modules to a first control line so that any one of said modules may switch said first control line from a first to a second binary condition when said one of said modules requests control of said bus unless another of said modules has previously switched said first control line to said second binary condition; interconnecting said modules in a series string so that a signal is propagated from one end of the string to and through all modules up to the one of said modules which has switched said first control line to said second binary condition; connecting said module which has switched said first control line to said bus; and simultaneously causing said module which has switched said first control line to restore said first control line to said first binary condition.

11. The method according to claim 10 including the steps of connecting each of said modules to a second control line; causing each module to switch said second control line from a first to a second binary condition as it is connected to said bus and from said second to said first binary condition as the module relinquishes control of said bus; and wherein said step of connecting said module which has switched said first control line to said bus comprises connecting said module with a predetermined delay after said second control line has been switched to said first binary condition.

12. In a data transmission system having a plurality of data-handling modules connectable to a bus system and wherein each of said modules is operable to provide a request signal to request control of said bus, the combination of a plurality of arbitrator units for responding to said request signals and determining which of said modules shall control said bus at a given time, each of said arbitrator units being associated with a respective one of said data-handling modules; first and second control lines connected to each of said arbitrator units, said arbitrator units being cascaded in a series string with a signal line extending between each adjacent pair of units in said string, and each of said arbitrator units comprising: first means for switching said first control line from a first to a second binary condition upon receipt of a request signal from its associated data-handling module unless another of said modules has previously switched said first control line to said second binary condition; means for applying an enabling signal on the signal line to the succeeding arbitrator unit if an enabling signal has been received on the signal line from the preceding arbitrator unit and if said first means has not switched said first control line; bi-stable switching means responsive to said first means, responsive to receipt of an enabling signal from the preceding arbitrator unit, and responsive to a first condition of said second control line for connecting the module associated with the arbitrator unit to said bus; means responsive to said switching means for disabling said first means to allow said first control line to return to said first binary condition; and means responsive to said switching means for deriving said second control line to a second binary condition.

* * * * *